E. A. CLARK.
DOUGH MOLDING MACHINE.
APPLICATION FILED JULY 16, 1914.
1,171,704.
Patented Feb. 15, 1916.
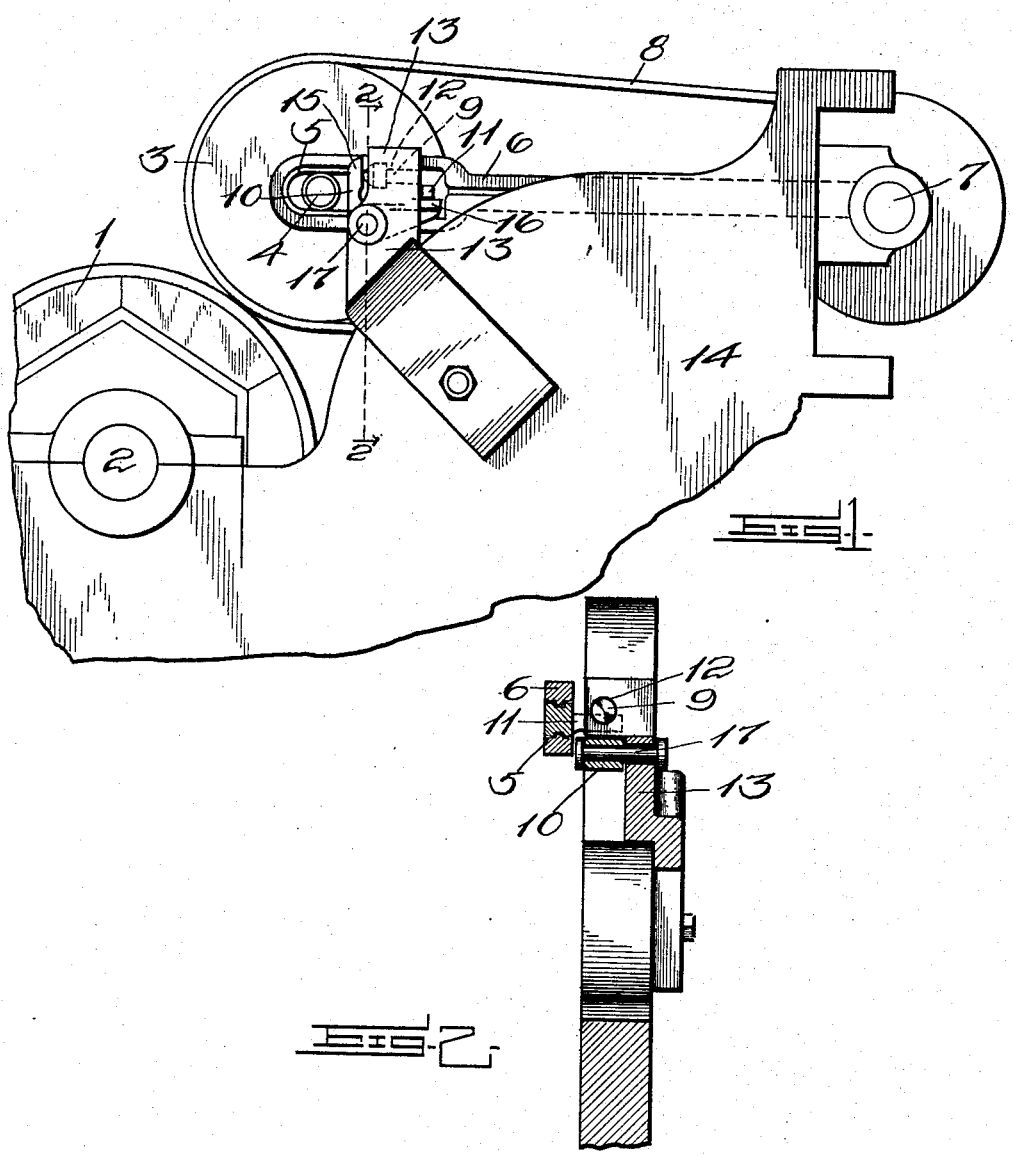
Witnesses
J. M. Lyles
W. I. Whitson
Inventor
Elmer A. Clark,
By J. Haskom
Attorney
THE COLUMBIA PLANOGRAPH CO., WASHINGTON, D. C.

UNITED STATES PATENT OFFICE.

ELMER A. CLARK, OF JOLIET, ILLINOIS.

DOUGH-MOLDING MACHINE.

1,171,704.　　　　　　　　Specification of Letters Patent.　　　Patented Feb. 15, 1916.

Application filed July 16, 1914. Serial No. 851,378.

*To all whom it may concern:*

Be it known that I, ELMER A. CLARK, a citizen of the United States, residing at Joliet, in the county of Will and State of Illinois, have invented certain new and useful Improvements in Dough-Molding Machines, of which the following is a specification.

The present invention has reference to dough apparatus, and more particularly to that type of molding apparatus in which the dough is fed between a pair of moving elements, in sheet or other form, and rolled thereby into balls or loaves. In apparatus of this type, the two co-acting rolling elements are usually arranged in superposed relation, and the upper one is so mounted as to enable it to move upward under the action of the dough, thus permitting the latter to pass between it and the lower element. In actual practice the pieces of dough should follow each other very closely through the apparatus, but with the ordinary construction of apparatus, it is extremely difficult, if not impossible, to obtain satisfactory results for the reason that the upper element on its return or downward movement, must necessarily rebound after having struck the lower element, and in consequence the succeeding piece of dough, instead of being properly rolled, is likely to emerge between the elements only partially rolled and shaped.

Accordingly it is the aim of this invention to obviate such defect by providing improved means or devices whereby the movable upper element is stopped immediately on completing its down-stroke, thus insuring its retention in correct position to act in conjunction with the lower element, upon the next piece of dough.

An embodiment of the invention is illustrated in the accompanying drawing, in which:

Figure 1 is a side elevation showing the attachment in use; and Fig. 2 is an enlarged vertical section on line 2—2, of Fig. 1.

As above stated, this invention is in the nature of an attachment for dough molding apparatus of the character specified. The apparatus itself constitutes, therefore, no part of the invention *per se*, and for this reason it is deemed necessary to show only so much of the apparatus as is requisite for an understanding of the invention. Accordingly, it is considered sufficient for present purposes to state that the apparatus includes a lower, faced or covered roller 1, mounted on a horizontal shaft 2, which rotates in a counter-clockwise direction, and an upper roller 3, having its trunnions 4 supported in the looped or slotted ends 5 of the side members 6 of a frame which is mounted to swing in a vertical plane about a horizontal axis or fulcrum that is constituted by a shaft or rod 7. The roller 3 has its axis arranged slightly in front of the shaft 2, whereon roller 1 is mounted, and is engaged by a belt 8, which passes therearound, the belt and the said roller 1 being driven in any desired manner and the latter forming with the upper roller 3, the two co-acting rolling elements previously referred to. So far as the operations of this part of the apparatus is concerned it may be stated that the roller end of the belt 8 is normally pressed against the covered peripheral surface of the roller 1, and that the dough is fed, by any means preferred, and in pieces of suitable size and shape, between the said rollers at the lower or right-hand side of the nip thereof, the direction of rotation of the upper roller being of course, opposite to that of the lower roller. The pieces of dough thus engaged are each rolled up into the form of balls or loaves, and as the rolling action continues, the tendency of the upper roller is to rise, carrying with it the supporting frame and belt, and thus ultimately permitting the roller-up lump of dough to pass between it and the lower roller. When the said lump has passed between the rollers, as just explained, the upper roller drops back to its former position, and it is to avoid the resultant rebound with its objectionable consequence that the locking means about to be described is provided, the locking action taking place automatically immediately after each fall of the upper roller. For this purpose, there is provided a movable member 9, here shown as in the form of a headed pin or stud, which is intermittently operated by a suitable impact element or hammer 10 and which coacts with a fixed lug, shoulder or like projection 11, carried by the loop end of the adjacent frame member 5.

In the construction illustrated, the headed stud is slidably mounted in a transverse recess 12, formed in the upper arm of an angular bracket 13 attached to the main frame 14 of the apparatus and to the same arm there is also connected the above-mentioned hammer. This hammer has preferably the shape of a bell-crank, one of its arms extending upwardly and having an enlarged terminal head 15, which is disposed directly behind the stud head, while its other arm extends horizontally, or approximately so, and terminates in a head 16 that is disposed directly beneath the projection 11. The hammer itself is pivoted at its apex on a pin 17, attached to the above-mentioned bracket arm. The arrangement of parts is such therefore, that when the upper roller, after having been raised, has started to drop, the projection 11 will strike against the head 16 of the horizontal arm of the hammer, thereby rocking said hammer about its pivot 17 and causing the head 15 of its vertical arm to strike sharply against the stud head. This blow results in the stud being driven forward a distance sufficient to cause its end to extend over the projection 11, thus holding the frame for an instant and consequently stopping the rebound of the roller. The next instant in which the frame rebounds from the member 9, allows this suspended member, freedom to fall against the bell crank and below the travel of this frame or projection 11. The pin then drops back against the bell crank and the frame sets in this position until the roller again starts to ascend, the stud having dropped back by gravity.

What I claim is:—

1. In a dough molding apparatus, the combination with a pair of superposed rolling elements, and a rising-and-falling frame carrying one of them; of a projecting member provided upon said frame; and locking means operable consequent upon the descent of the frame and engageable with said projecting member for momentarily holding said frame against upward movement.

2. In a dough molding apparatus, the combination, with a pair of superposed rolling elements; and a rising-and-falling frame carrying one of them; a projecting member provided upon said frame; a locking member engageable with said projecting member to hold said frame against upward movement, and an impact element operable consequent upon the descent of said frame and adapted to strike against and actuate said locking member.

3. In a dough molding apparatus, the combination, with a pair of superposed rolling elements; and a rising-and-falling frame carrying one of them; a projecting member provided upon said frame; a locking member engageable with said projecting member to hold said frame against upward movement, and an impact element operable by said projecting member consequent upon the descent of said frame and adapted to strike against and actuate said locking member.

4. In a dough molding apparatus, the combination, with a pair of superposed rolling elements, and a rising-and-falling frame carrying one of them; of a projecting member provided upon said frame; and locking means operable by said projecting member consequent upon the descent of the frame for momentarily holding said frame against upward movement.

5. In a dough molding apparatus, the combination, with a pair of superposed rolling elements, and a rising-and-falling frame carrying one of them; of a projecting member provided upon said frame; and locking means operable by said projecting member and engageable with the same consequent upon the descent of the frame for momentarily holding said frame against upward movement.

6. In a dough molding apparatus, the combination, with a pair of superposed rolling elements; and a rising-and-falling frame carrying one of them; of means operable by said frame consequent upon the descent thereof to momentarily lock said frame against upward movement.

7. In a dough molding apparatus, the combination, with a pair of superposed rolling elements; and a rising-and-falling frame carrying one of them; of a movable locking member; a projection on said frame with which said locking member co-acts; and an element having an arm which extends into the path of said projection for actuation thereby during the descent of the frame, and a second arm which is adapted to engage and operate said locking member consequent upon such actuation.

In testimony whereof I affix my signature in presence of two witnesses.

ELMER A. CLARK.

Witnesses:
CHARLES BOOKLUND,
ALBERT WELSE.

Copies of this patent may be obtained for five cents each, by addressing the "Commissioner of Patents, Washington, D. C."